(12) United States Patent
Jaiswal et al.

(10) Patent No.: US 12,321,626 B1
(45) Date of Patent: Jun. 3, 2025

(54) COPY DATA'S TIER MANAGEMENT

(71) Applicant: HITACHI, Ltd., Tokyo (JP)

(72) Inventors: Satish Kumar Jaiswal, Santa Clara, CA (US); Hiroyuki Osaki, Los Gatos, CA (US); Tomohiro Kawaguchi, Santa Clara, CA (US)

(73) Assignee: HITACHI, Ltd., Tokyo (JP)

( * ) Notice: Subject to any disclaimer, the term of this patent is extended or adjusted under 35 U.S.C. 154(b) by 24 days.

(21) Appl. No.: 18/513,933

(22) Filed: Nov. 20, 2023

(51) Int. Cl.
*G06F 3/06* (2006.01)
(52) U.S. Cl.
CPC ............ *G06F 3/0644* (2013.01); *G06F 3/061* (2013.01); *G06F 3/065* (2013.01); *G06F 3/0685* (2013.01)

(58) Field of Classification Search
CPC ........ G06F 3/0644; G06F 3/061; G06F 3/065; G06F 3/0685
See application file for complete search history.

(56) References Cited

U.S. PATENT DOCUMENTS 10,097,634 B1 * 10/2018 Gorantla ................. G06F 3/067
2022/0229733 A1    7/2022 Chitloor et al.

* cited by examiner

*Primary Examiner* — Chie Yew
(74) *Attorney, Agent, or Firm* — PROCOPIO, CORY, HARGREAVES & SAVITCH LLP

(57) ABSTRACT

Systems and methods described herein can involve, for a request to create a recovery volume having a specified recovery time objective, identifying a tier from a storage system managing a plurality of tiers that has a restore time that satisfies the specified recovery time objective; and creating the recovery volume in the identified tier of the storage system in response to the request.

13 Claims, 15 Drawing Sheets

Manage storage tiers

— Specification of the tier to create in the alternative site —

| Tier name | Price | Max read thoughput | Max write throughput |
|---|---|---|---|
| Alt. Tier-2 | USD 1 / GB-month | 5 Gbps | 5 Gbps |

— Storage at alternative site which matches the specification of tier above —

■ An SDS pool ■ A cloud vendor's storage service

| Select SDS | Select pool | | Select storage service | |
|---|---|---|---|---|
| ▼ sds-1at-site-1 | ▼ mid-perf-pool-2 | ■ Access ready | ▼ Block service | ☐ Access ready |

— Equivalent storage tier at production site? —

○ None  ● Exists  Select tier name
▼ Prod. Tier-2

[ Cancel ]  [ Apply ]

---

Notification 410

The following tier was successfully created in the alternative site.

>Tier name: Alt. Tier-2
>Price: USD 1 / GB-month
>Max read throughput: 5 Gbps
>Max write throughput: 5 Gbps
>SDS: sds-1-at-site-1
>SDS pool: mid-perf-pool-2
>Cloud vendor's storage service: Block service
>Equivalent tier at production site: Prod. Tier-2

| Id | Tier name 330-1 | Price 330-2 | Max read throughput 330-3 | Max write throughput 330-4 | Matching SDS 330-5 | Matching SDS pool 330-6 | Is SDS access ready? 330-7 | Matching cloud vendor's service 330-8 | Is vendor's storage access ready? 330-9 | Equivalent tier at production site 330-10 |
|---|---|---|---|---|---|---|---|---|---|---|
| 1 | Alt. Tier-1 | USD 1.5 / GB-month | 1.25 GB/s | 1.25 GB/s | sds-1-at-site-1 | high-perf-pool-1 | Yes | n/a | n/a | Prod. Tier-1 |
| 2 | Alt. Tier-2 | USD 1 / GB-month | 0.625 GB/s | 0.625 GB/s | sds-1-at-site-1 | mid-perf-pool-1 | Yes | Block storage | No | Prod. Tier-2 |
| 3 | Alt. Tier-3 | USD 0.5 / GB-month | 12.5 GB/s | 12.5 GB/s | n/a | n/a | n/a | Object storage | No | n/a |

FIG. 6

| Id | Prod. Volume name 320-1 | Prod. Volume size 320-2 | Prod. Volume tier 320-3 | Prod. Volume RTO 320-4 | Alt. volume tier 320-5 | Alt. volume name 320-6 |
|---|---|---|---|---|---|---|
| 1 | vol-order | 1 TB | Prod. Tier-1 | 10 min | Alt. Tier-1 | alt-vol-order |
| 2 | vol-inventory | 2 TB | Prod. Tier-1 | 1 hour | Alt. Tier-2 | alt-vol-inventory |
| 3 | vol-sales | 4 TB | Prod. Tier-1 | 1 day | Alt. Tier-3 | alt-vol-sales |

FIG. 7

| Id | Prod. Volume name 340-1 | Alt. Tier-1 340-2 | Alt. Tier-2 340-3 | Alt. Tier-3 340-4 |
|---|---|---|---|---|
| 1 | vol-order | 5 min | 27 min | 14 min |
| 2 | vol-inventory | 5 min | 54 min | 28 min |
| 3 | vol-sales | 5 min | 1.8 hr | 56 min |

FIG. 8

COPY DATA'S TIER MANAGEMENT

BACKGROUND

Field

The present disclosure is generally directed to storage systems, and more specifically, to tier management for copy data.

Related Art

The Global Disaster Recovery as a Service (DRaaS) market is expected to grow over the next decade. As in any As-A-Service business model, Service Level Agreements (SLAs) are important in DRaaS as well. SLAs between a Service provider and a Service consumer makes the Service provider legally responsible for protecting the data of the Service consumer from any disaster. Failing to meet the SLAs results in a penalty to be paid by the Service provider to the Service consumer.

Recovery Time Objective (RTO) is one of the most important objectives in the SLAs of DRaaS. RTO is the time taken after the failure of the production data to bring the alternate data online. Traditionally, minimizing the RTO had been the primary goal of the Service providers. However, with the advent of the As-A-Service model, satisfying the RTO has become the primary goal.

In the related art, there is a rule-based re-tiering of incremental backup data stored on a cloud-based object storage. In such a related art implementation, the backup data is initially stored in the high performing tier to ensure minimum possible RTO. When the high-performing tier is full, such implementations copy some of the backup files to the low performing tier. The backup file to copy in the low performing tier is determined in such a way that the RTO is kept to a minimum.

SUMMARY

In the related art implementations, the Service provider has to overprovision resources because it is difficult to predict the RTO request from the Service consumer in advance. Further, the Service consumers are concerned about the reliability as to whether their RTO request will be satisfied, and will thereby prepare their own infrastructure rather than using DRaaS. Related art implementations do not address the overprovisioning problem of the Service provider nor do they resolve the reliability concern of the Service consumer.

Example implementations described herein are directed to systems and methods that facilitate the Service provider to meet the agreed RTO while providing reliable and economically competitive service to the Service consumers. Such example implementations allow for the Service provider to meet the agreed RTO without having to overprovision the resources. As a result, the Service consumer gets a reliable service at economically competitive price and is encouraged to use the DraaS solution.

Example implementations described herein do so by explicitly requiring the Service consumer to provide the RTO, comparing the RTO with the time taken to restore the alternate volume from each of the available storage tiers, and finally storing the alternate volume in the storage tier having a restore time that is smaller than the RTO. If there are many storage tiers which satisfy the RTO, then it is stored in the cheapest storage tier.

Aspects of the present disclosure can involve a method, which can involve, for a request to create a recovery volume having a specified recovery time objective, identifying a tier from a storage system managing a plurality of tiers that has a restore time that satisfies the specified recovery time objective; and creating the recovery volume in the identified tier of the storage system in response to the request.

Aspects of the present disclosure can involve a computer program, which can involve instructions including, for a request to create a recovery volume having a specified recovery time objective, identifying a tier from a storage system managing a plurality of tiers that has a restore time that satisfies the specified recovery time objective; and creating the recovery volume in the identified tier of the storage system in response to the request. The computer program can be stored on a non-transitory computer readable medium and executed by one or more processors.

Aspects of the present disclosure can involve a system, which can involve, for a request to create a recovery volume having a specified recovery time objective, means for identifying a tier from a storage system managing a plurality of tiers that has a restore time that satisfies the specified recovery time objective; and means for creating the recovery volume in the identified tier of the storage system in response to the request.

Aspects of the present disclosure can involve an apparatus, which can involve a processor, configured to, for a request to create a recovery volume having a specified recovery time objective, identify a tier from a storage system managing a plurality of tiers that has a restore time that satisfies the specified recovery time objective; and create the recovery volume in the identified tier of the storage system in response to the request.

BRIEF DESCRIPTION OF DRAWINGS

FIG. 3 illustrates an example of a screen interface provided by the Copy data's tier management program for display to the Service provider for managing the storage tiers in the Alternate site, in accordance with an example implementation.

FIG. 6 illustrates an example of the storage tier info table, in accordance with an example implementation.

FIG. 7 illustrates the Volume info table, in accordance with an example implementation.

FIG. 8 illustrates the Restore time info table, in accordance with an example implementation.

DETAILED DESCRIPTION

Figure 1:
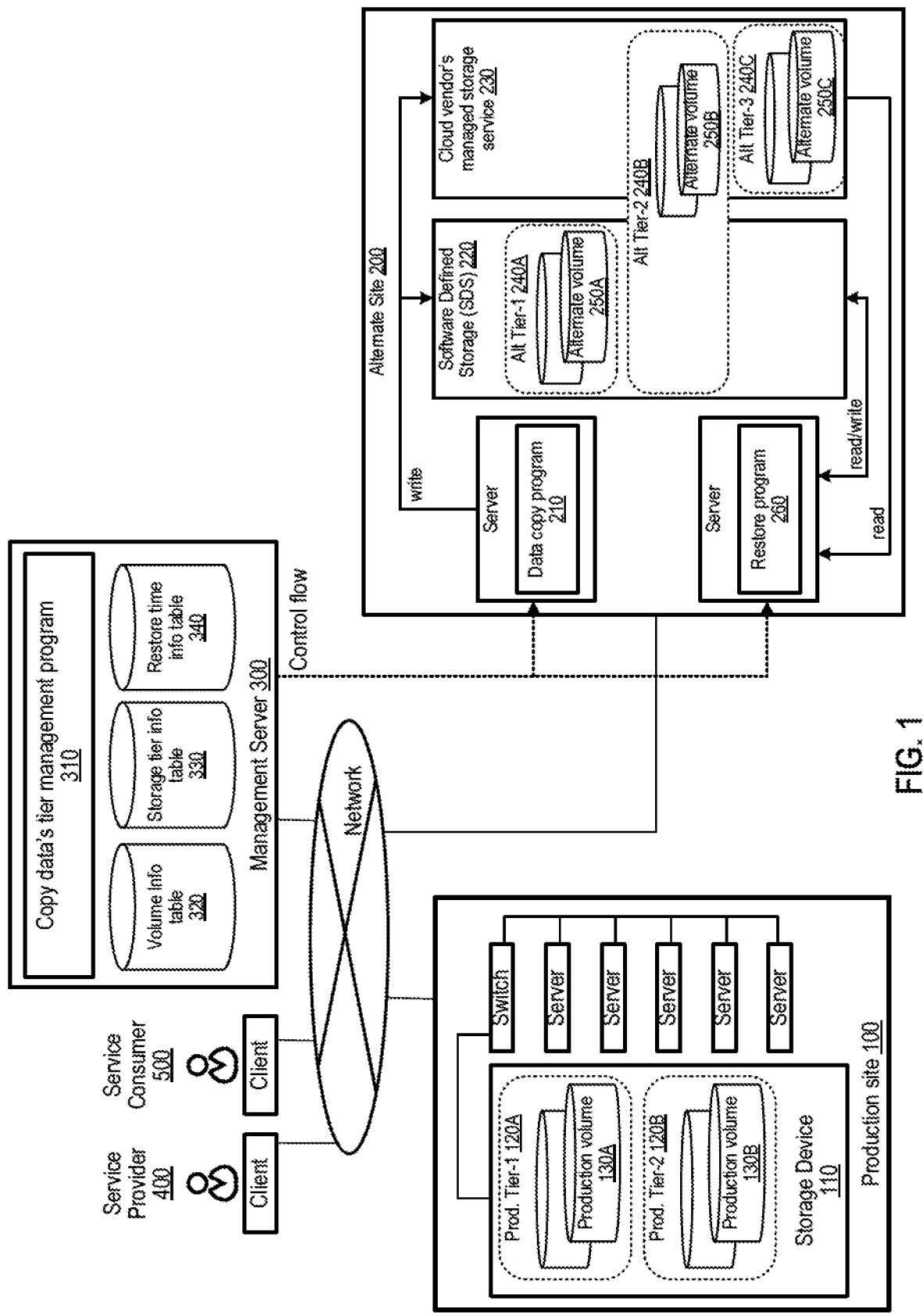
FIG. 1 illustrates an example of the overall system structure, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means or can be implemented through a desired algorithm. Example implementations as described herein can be utilized either singularly or in combination and the functionality of the example implementations can be implemented through any means according to the desired implementations.

FIG. 1 illustrates an example of the overall system structure, in accordance with an example implementation. The system involves one or more Production sites 100, one or more Alternate sites 200, a Management server 300, a Service provider 400 and one or many Service consumers 500. These components connect to each other via a network (e.g., Internet).

The Service provider 400 manages the Production site 100, the Alternate site 200, the Management server 300 and the network to provide DRaaS to one or many Service consumer 500. The Service consumer 500 uses a user interface to enter the RTO which the DRaaS must satisfy. This user interface is implemented in the copy data's tier management program 310 of the Management server 300.

The Management server 300 can involve the following. There is no restriction regarding the implementation of the Management server 300 as long as it is connected to the network. For example, the Management server 300 can be external, or can run either on the Production site 100 or the Alternate site 200 or via any other desired implementation.

Copy data's tier management program 310 is configured to provide a Service consumer facing user interface for entering the RTO and Service provider facing user interface for managing the tiers, determines the tier of the alternate volume based on the RTO, instructs the Data copy program 210 to copy data from the production volume to its corresponding alternate volume, and instructs the Restore program 260 to restore the alternate volume to its original tier in the Software Defined Storage (SDS) 220 in case a restore operation is requested by the Service consumer 500.

Volume info table 320 stores information about a list of production volumes and their corresponding alternate volumes. Storage tier info table 330 stores information regarding the list of tiers in the Alternate site 200 and their equivalent tiers in the Production site 100. Restore time info table 340 stores information regarding the list of volumes and their corresponding restore times from different tiers.

The Alternate site 200 can be implemented on the cloud and can include a data copy program 210. The data copy program 210 copies data from the Production volume in the Production site to their corresponding Alternate volume in the Alternate site.

Software Defined Storage (SDS) 220: The SDS is managed by the Service provider 400. The SDS 220 provides Storage tiers in the Alternate site 200 which are equivalent to those in the Production site 100. This may be required because the Cloud vendor's managed storage service 230 might not have Storage tiers equivalent to that in the Production site 100.

Cloud vendor's managed storage service 230: These are the storage service managed by the cloud vendors themselves. The Service provider 400 can leverage such managed services to storage the Alternate volume if it is possible to satisfy the RTO. The Service provider 400 categorizes the Cloud vendor's managed storage service 230 into different tiers based on performance, price, and so on.

Storage tiers: A Storage tier is characterized by gradation of one or more Key Performance Indicators (KPIs) such as Input/Output operations per second (IOPS), throughput, and so on. The SDS provides equivalent storage tiers as that of the Production site. For example, Alt. Tier-1 240A and Alt. Tier-2 240B are equivalent to Prod. Tier-1 120A and Prod. Tier-2 120B respectively. This equivalency of the storage tiers is maintained by the Service provider 400. It is also possible that a storage tier might span both the SDS 220 and the Cloud vendor's managed storage service 230 such as Alt. Tier-2 240B. Alt. Tier-3 240C can be the cloud only solution.

Alternate volume: An alternate volume is a copy of the production volume which is stored in a geographically separated region so that it can be used in case the production volume is unusable (for example due to disaster). It is stored in the Alternate site in the tier determined by Copy data's tier management program 310. It is either stored in the SDS such as Alternate volume 250A or in the Cloud vendor's managed storage service such as Alternate volume 250B and 250C.

Restore program 260: It restores the Alternate volume to its original tier in SDS 220. The speed of the restore process is determined by its read and write throughput. It needs to read the Alternate volume from both the Cloud vendor's managed storage service 230 and the SDS 220. However, the restore program only needs to write to the SDS for restoring the Alternate volume to its original tier. For example, it first reads the Alternate volume 250C from the Cloud vendor's managed storage service 230 and then writes it to its original tier in SDS 220.

The Production site 100 can either be on-premises or on cloud and can involve the following.

Storage device 110: One or more Storage devices are connected to one or more Servers via one or more Switches.

Storage tiers: The one or more Storage devices 110 may have one or more Storage tiers such as Production Tier-1 120A, Production Tier-2 120B, and so on. A Storage tier is characterized by gradation of one or more KPIs such as IOPS, throughput, and so on. It can span over one or more Storage devices 110.

Production volume 130: One or more Production volumes can be provisioned inside a Storage tier of a Storage device. For example, Production volume 130A is provisioned inside Tier-1 120A of Storage device 110, whereas production volume 130B is stored in Tier-2 120B.

Figure 2:
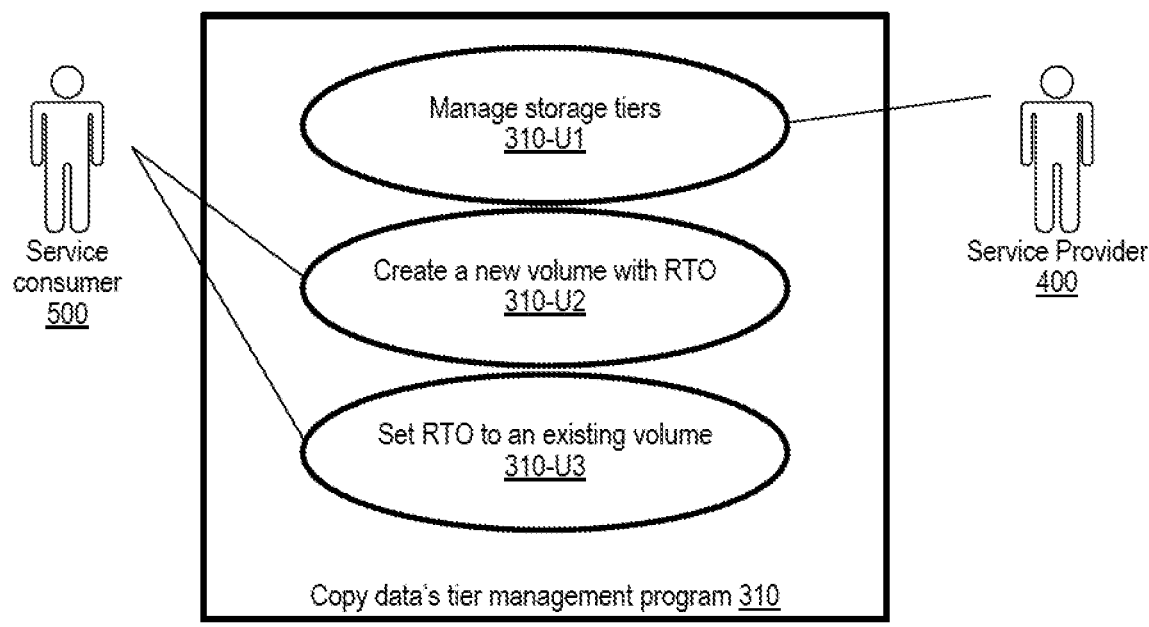
FIG. 2 illustrates an example of the use case diagram for Copy data's tier management program, in accordance with an example implementation.

FIG. 2 illustrates an example of the use case diagram for Copy data's tier management program 310, in accordance with an example implementation. This is a use case diagram for Copy data's tier management program 310.

Service provider 400 manages storage tiers 310-U1. Storage consumer 500 can create a new volume with RTO 310-U2, and set RTO to an existing volume 310-U3.

FIG. 3 illustrates an example of a screen interface provided by the Copy data's tier management program 310 for display to the Service provider 400 for managing the storage tiers in the Alternate site 200, in accordance with an example implementation.

The diagram shows the case of registering Alt. Tier-2 240B in FIG. 1. The Service provider 400 provides the name, price, maximum read and write throughput of the tier to create in the Alternate site 200. The Service provider 400 also provides information about any storage in the Alternate site 200 which matches the specification of the tier being registered. It is possible to register a matching SDS pool or a matching cloud vendor's storage service or both.

The Service provider 400 checks the Access ready flag to indicate if an Alternate volume provisioned in that storage can be used for reading and writing immediately after failover from the Production volume without any extra effort. For example, in the figure below, the SDS is Access ready while the Block service from the cloud vendor is not. They also provide the name of an equivalent storage tier at the production site if any are applicable. The summary of the registration can be notified through a notification 410 as illustrated in FIG. 3. The information provided in this user interface is stored in the Storage tier info table 330, details of which are explained in FIG. 6.

Figure 4:
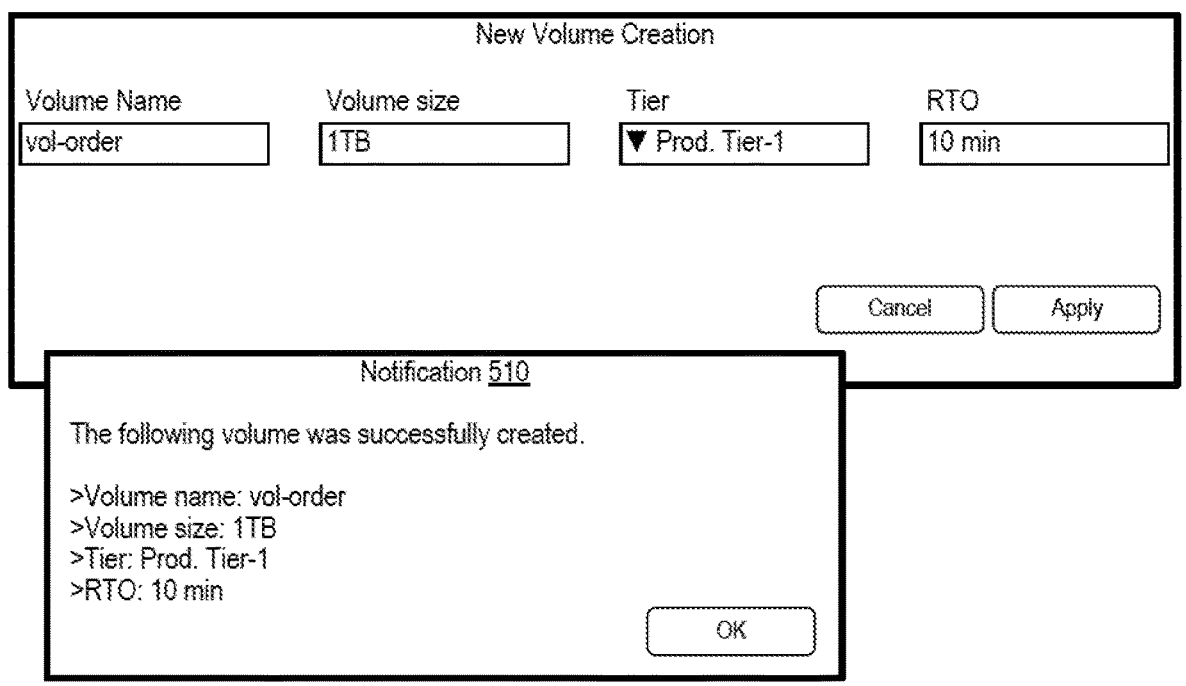
FIG. 4 illustrates an example screen interface provided by the Copy data's tier management program for display to the Service consumer for creating a new volume with RTO, in accordance with an example implementation.

FIG. 4 illustrates an example screen interface provided by the Copy data's tier management program 310 for display to the Service consumer 500 for creating a new volume with RTO, in accordance with an example implementation.

The Service consumer 500 provides the name, size, tier and RTO of the volume to be created in the Production site 100. The specified volume is created in the Production site 100 and its Alternate volume is also created in the tier determined by Copy data's tier management program 310 in the Alternate site 200. The summary of the volume creation can be notified as shown in the notification 510 in FIG. 4. The information provided in this user interface is stored in the Volume info table 320, details of which are explained in FIG. 7.

Figure 5:
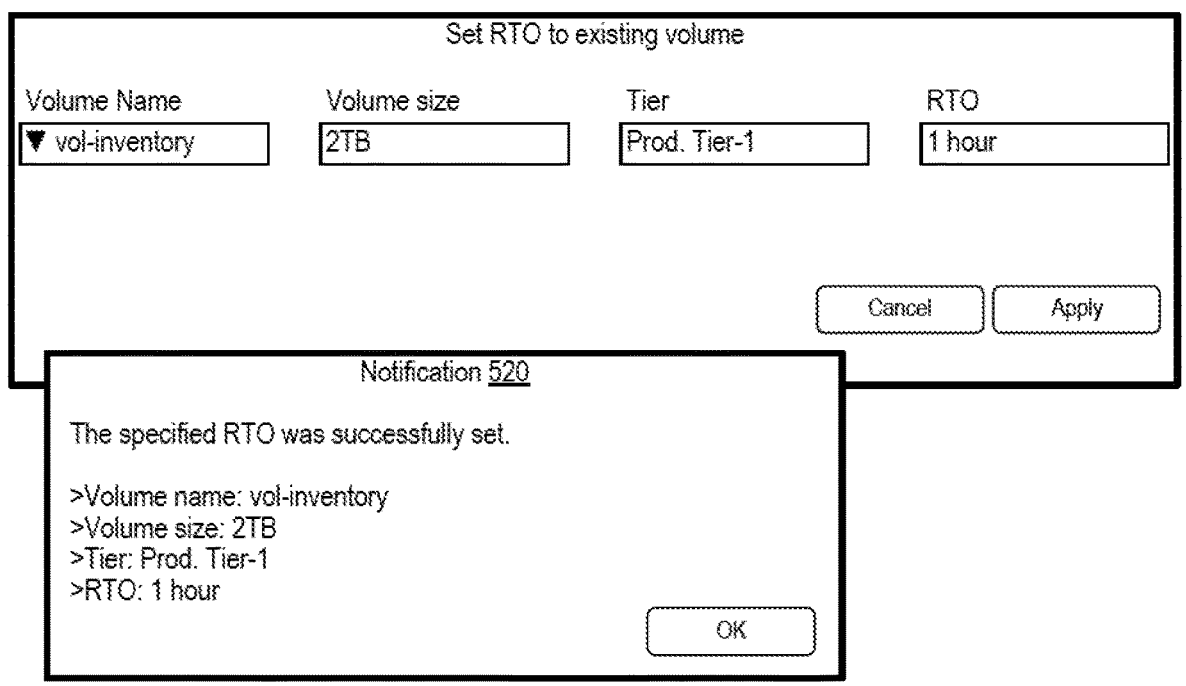
FIG. 5 illustrates an example screen interface provided by the Copy data's tier management program for display to the Service consumer for setting RTO to an existing volume, in accordance with an example implementation.

FIG. 5 illustrates an example screen interface provided by the Copy data's tier management program for display to the Service consumer 500 for setting RTO to an existing volume, in accordance with an example implementation. The Service consumer 500 selects an existing volume and provides its RTO. Information such as size and tier can be obtained from the existing record in the Production site and is displayed in the GUI as read only field.

An Alternate volume for the specified volume is created in the tier determined by Copy data's tier management program 310 in the Alternate site 200. The summary of the operation can be notified as shown in the notification 520 of FIG. 5. The information provided in this user interface is stored in the Volume info table 320, details of which are explained in FIG. 7.

FIG. 6 illustrates an example of the storage tier info table 330, in accordance with an example implementation. The Storage tier info table 330 is stored in the Management server 300 and is used by the Copy data's tier management program 310 for managing the storage tiers in the Alternate site 200. The Storage tier info table 330 is stored the information provided by the Service provider 400 during storage tier registration as shown in FIG. 3.

Tier name 330-1 stores the unique name of the storage tiers in the Alternate site 200.

Price 330-2 stores the price that the Service provider 400 will charge to the Service consumer 500 for storing the Alternate volume in that tier.

Max read throughput 330-3 and Max write throughout 330-4 are the maximum read and write throughput possible for an Alternate volume in that tier.

Matching SDS 330-5 and Matching SDS pool 330-6 store information about the storage provided by SDS 220 which meets the max read and write throughput criteria for that tier. For example, Alt. Tier-1 and Alt. Tier-2 has matching storage in the SDS named "sds-1-at-site-1", and these tiers map to pools named "high-perf-pool-1" and "mid-perf-pool-1" respectively. If the criteria are not met, then simply n/a is recorded for that tier. For example, Alt. Tier-3 does not have any matching SDS. Hence, n/a is recorded for the columns 330-5 and 330-6.

"Is SDS access ready?" 330-7 is a flag indicating that an Alternate volume provisioned in the matching SDS pool of this tier can be used for reading and writing immediately after failover from the Production volume without any extra effort. For example, Alt. Tier-1 and Alt. Tier-2 are Access ready. "n/a" is recorded in case that tier does not have any matching SDS. For example, Alt. Tier-3 does not have any matching SDS. Hence, "n/a" is recorded in the column 330-7.

Matching cloud vendor's service 330-8 stores information about the storage provided by the cloud vendor which meets the max read and write throughput criteria for that tier. For example, Alt. Tier-2 and Alt. Tier-3 has matching managed storage service from the cloud vendor called Block storage and Object storage respectively. If the criteria are not met, then simply n/a is recorded for that tier. For example, Alt. Tier-1. does not have any matching managed storage service. Hence, n/a is recorded for the column 330-8.

"Is vendor's storage access ready?" 330-9 is a flag indicating that an Alternate volume provisioned in the matching cloud vendor's storage service of this tier can be used for reading and writing immediately after failover from the Production volume without any extra effort. For example, neither Alt. Tier-2 nor Alt. Tier-3 are access ready. The Alternate volume stored in these storages must be restored appropriately in the SDS 220 by Restore program 260. n/a is recorded in case that tier does not have any matching cloud vendor's storage. For example, Alt. Tier-1 does not have any matching cloud vendor's storage. Hence, "n/a" is recorded in the column 330-9.

Equivalent tier at production site 330-10 stores the name of tier in the Production site 100 which are equivalent to the tier in the Alternate site 200. For example, Alt. Tier-1 and Alt. Tier-2 are equivalent to the Prod. Tier-1 and Prod. Tier-2.

FIG. 7 illustrates the Volume info table, in accordance with an example implementation.

The Volume info table 320 is stored in the Management server 300 and is used by the Copy data's tier management program 310 for storing information about the Production volumes and their corresponding Alternate volumes. It stores information such as name 320-1, size 320-2, tier 320-3 and RTO 320-4 of the Production volumes which are provided by the Service consumer 500 either during new volume creation as shown in the user interface of FIG. 4, or during setting RTO to an existing volume as shown in the user interface of FIG. 5.

The columns 320-5 and 320-6 stores the tier and name of the Alternate volume. The tier is determined by the Copy data's tier management program 310 after the Service consumer 500 clicks on the Apply button of the user interface in FIG. 4 or FIG. 5. It then provisions the Alternate volume in that tier and stores that information in this table.

FIG. 8 illustrates the Restore time info table, in accordance with an example implementation. The Restore time info table 340 is stored in the Management server 300. It stores an estimate of the time taken to restore the Alternate volume to its original tier in SDS from every available tier in the Alternate site. The estimation of the restore time is done by Restore time estimation module of Copy data's tier management program 310. The fields can involve the production volume name 340-1, Alt. Tier-1 340-2, Alt. Tier-2 340-3, and Alt. Tier-3 340-4.

For example, consider the first record in this table. This record means that it takes 5 minutes, 27 minutes, and 14 minutes to restore the Alternate volume of the Production volume named "vol-order" to its original tier if it was stored in Alt. Tier-1, Alt. Tier-2 and Alt. Tier-3 respectively. The original tier is a tier in the Alternate site which is equivalent to the Production volume's tier. In this case, the Production volume's tier is Prod. Tier-1 (by referring to Volume info table 320) and its equivalent tier in the Alternate site is Alt. Tier-1 (by referring to Storage tier info table 330). This means that the Alternate volume has to be restored to Alt. Tier-1 if it is stored in any other tier.

Storing the Alternate volume in the original tier (e.g., Alt. Tier-1) will not require any restore operation and failover can be done immediately. The restore time is constant (e.g., five minutes in this example) and RTO will be satisfied if the Alternate volume is stored in the original tier. However, if the RTO is long enough, it might be possible to store the Alternate volume in cheaper tiers and start the restore operation once after failover is requested. For this, the Restore time estimation module estimates the time taken to restore the Alternate volume to Alt. Tier-1 from every other tier in the Alternate site.

Figure 9:
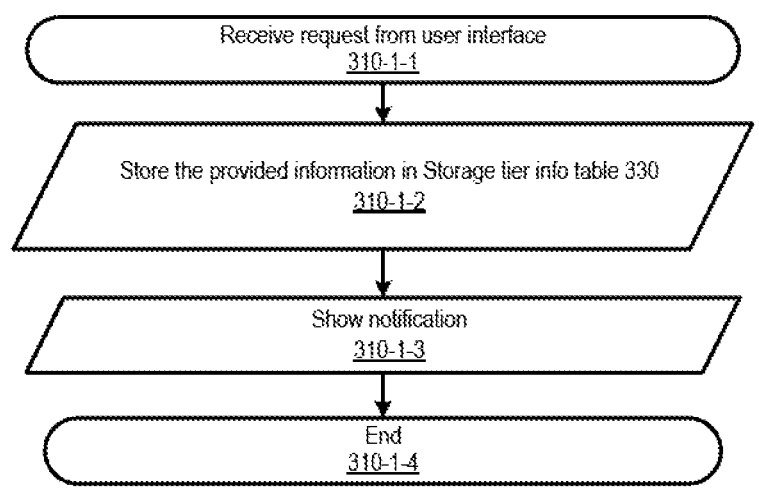
FIG. 9 illustrates the flow of the Copy data's tier management program after the Service provide has entered the required information in the Graphical User Interface (GUI) of FIG. 3, in accordance with an example implementation.

FIG. 9 illustrates the flow of the Copy data's tier management program 310 after the Service provider 400 has entered the required information in the Graphical User Interface (GUI) of FIG. 3, in accordance with an example implementation. This flow is executed when the Apply button is clicked in the GUI of FIG. 3.

After receiving the request from the GUI at 310-1-1, it stores the provided information in the Storage tier info table 330 310-1-2 and displays the notification of the operation to the Service provider 400 at 310-1-3, whereupon the flow ends at 310-1-4.

Figure 10:
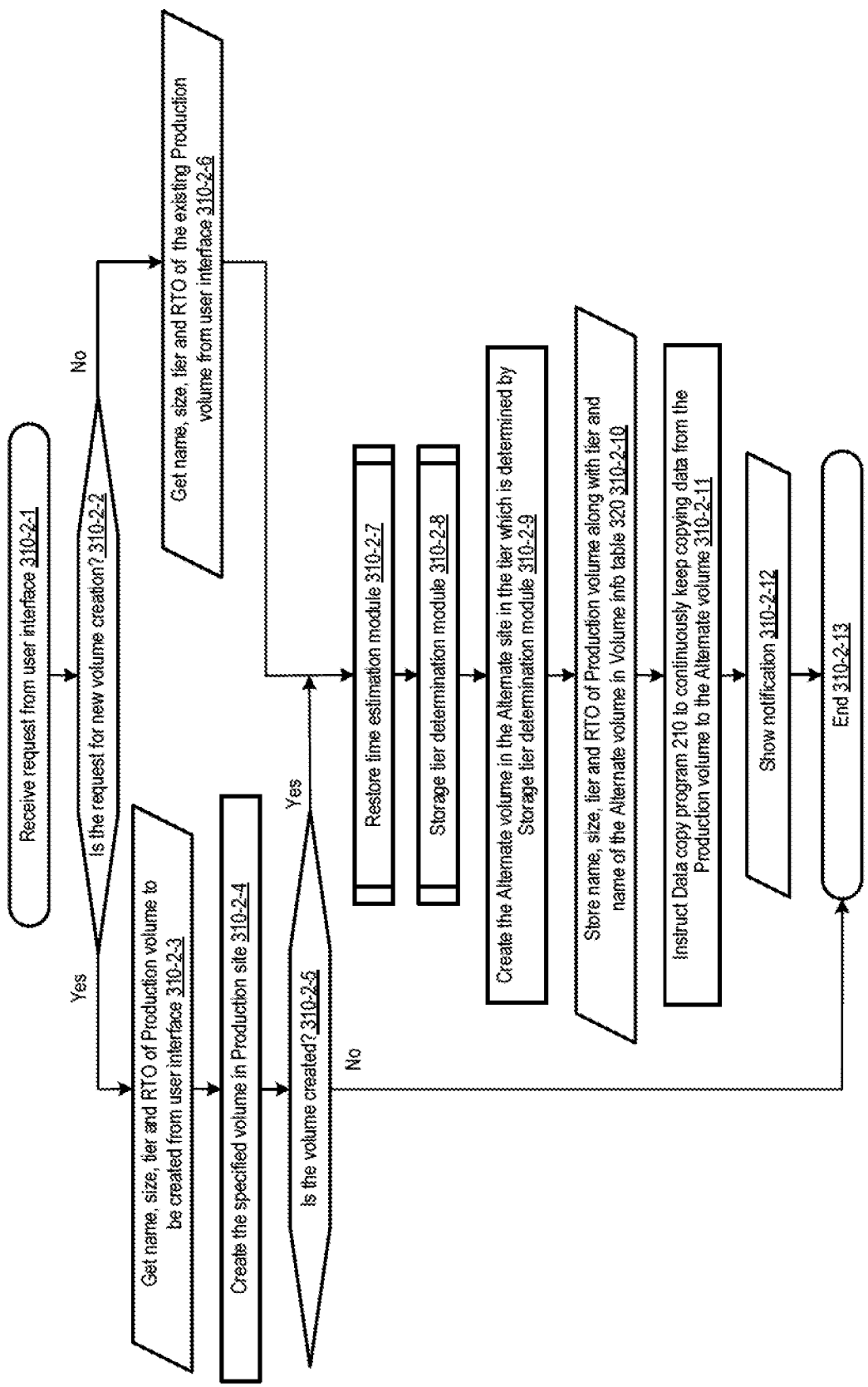
FIG. 10 illustrates the flow of the Copy data's tier management program after the flow of the Copy data's tier management program after the Service consumer has entered the required information in the GUI of either FIG. 4 or FIG. 5, in accordance with an example implementation.

FIG. 10 illustrates the flow of the Copy data's tier management program 310 after the flow of the Copy data's tier management program 310 after the Service consumer 500 has entered the required information in the GUI of either FIG. 4 or FIG. 5, in accordance with an example implementation. Parts of the flow of FIG. 10 can be triggered when the Apply button of FIG. 4 or FIG. 5 is clicked. At first, the request is received at 310-2-1.

The flow for new volume creation and existing volume is differentiated at the Step 310-2-2 of the flowchart. In case of new volume creation, the Service consumer 500 is required to enter the name, size, tier and RTO of the volume as mentioned in Step 310-2-3 of the flowchart. Then the specified volume is created in the Production site as mentioned in Step 310-2-4 of the flowchart. The volume creation flow can be implemented through any volume creation mechanism in accordance with the desired implementation. It is imperative to check that the volume has been created as mentioned in Step 310-2-5 of the flowchart before moving on the flow for creating an Alternate volume. It does not make sense to create an Alternate volume if the Production volume creation failed.

In case of an existing volume, the Service consumer 500 only needs to provide the name of the volume and the RTO for the volume at 310-2-6. Information such as size and tier can be obtained from the existing record in the Production site as needed.

With the name, size, tier and RTO of the Production volume, the Restore time estimation module 310-2-7 estimates the time taken to restore the Alternate volume to its original tier in SDS if it was stored in every available tier in the Alternate site. This information is recorded in the Restore time info table 340.

The Storage tier determination module 310-2-8 then determines the tier for the Alternate volume. It does so by comparing the RTO of the Production volume with the restore time for each tier in the Alternate site. Among the tiers whose restore time is lesser than the RTO, it selects the cheapest tier to store the Alternate volume.

After the tier for the Alternate volume has been determined, an Alternate volume is created in that tier in the Alternate site as mentioned in Step 310-2-9 of the flow. The volume creation flow can be conducted via any desired implementation as is known in the art. For a tier which spans both the SDS 220 and the Cloud vendor's managed storage service 230 such as Alt. Tier-2 250B, it is desirable but not necessary to store the Alternate volume in the Cloud vendor's managed storage service 230 rather than the SDS 220.

After the Alternate volume has been created, the information is recorded in the Volume info table 320 as mentioned in Step 310-2-10 of the flow. The Copy data's tier management program 310 then instructs the Data copy program 210 to continuously keep copying the data from the Production volume to the Alternate volume as mentioned in Step 310-2-11. The detail of the operation is notified to the Service consumer 500 at 310-2-12, and then the flow ends at 310-2-13.

Figure 11:
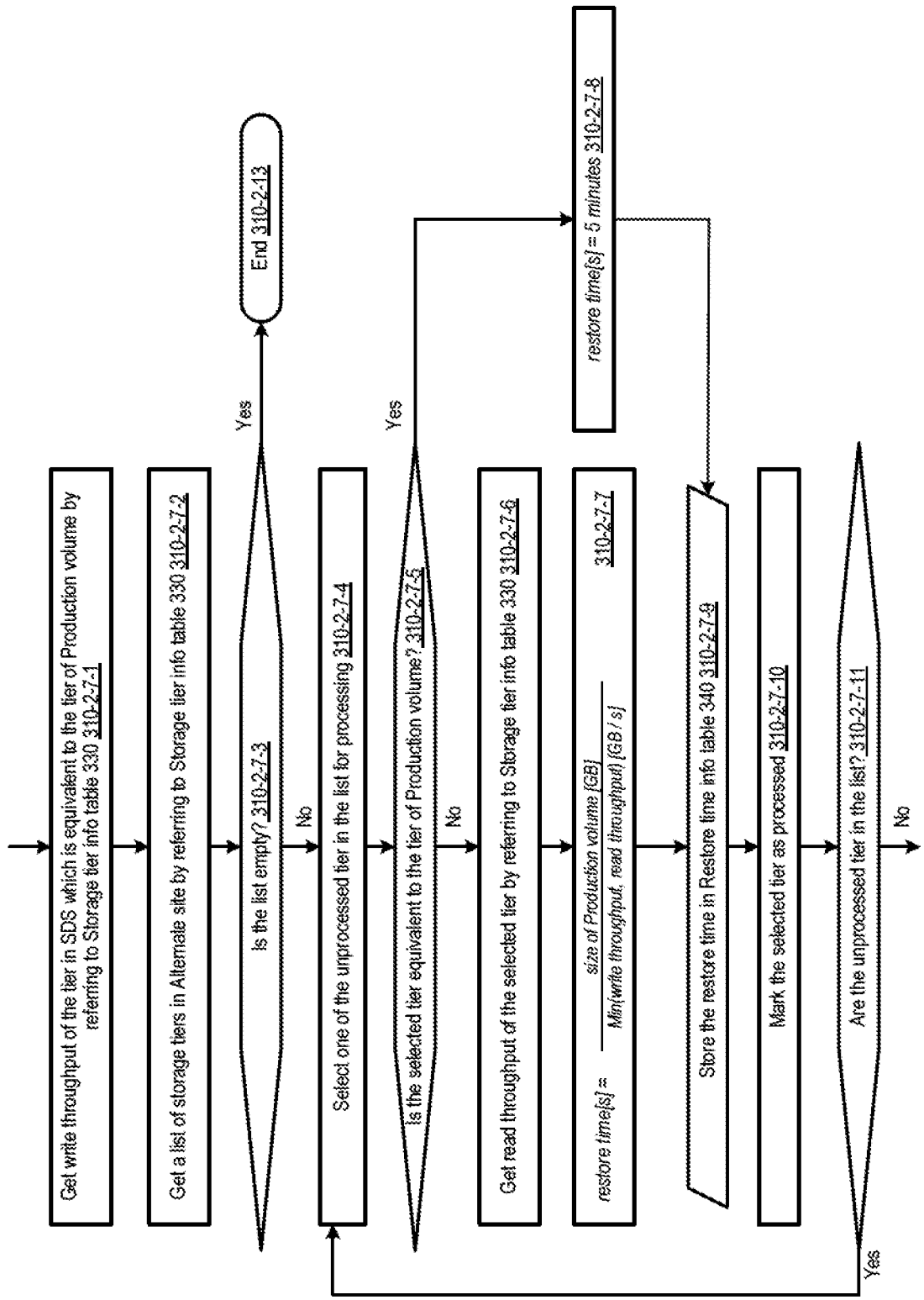
FIG. 11 illustrates the flow of the Restore time estimation module, which is a part of the Copy data's tier management program, in accordance with an example implementation.

FIG. 11 illustrates the flow of the Restore time estimation module 310-2-7, which is a part of the Copy data's tier management program 310, in accordance with an example implementation. It calculates an estimate of the time taken to restore the Alternate volume to its original tier in SDS if it was stored in every available tier in the Alternate site. The result is stored in Restore time info table 340 as shown in FIG. 8.

The restore operation is done by the Restore program 260. It basically reads the Alternate volume and then writes it to the original tier in SDS. For this, the write throughput of the original tier in SDS is determined by referring to the Storage tier info table 330 as explained in Step 310-2-7-1. For example, for the Production volume "vol-order", the original tier is Alt. Tier-1 (which is equivalent of Prod. Tier-1) and its write throughput is 1.25 GB/s. The list of available storage tiers in the alternate site is also obtained by referring to the Storage tier info table 330 at 310-2-7-2. If there are no available tiers available (list is empty) at 310-2-7-3, then the flow ends at 310-2-13, otherwise (No) the flow proceeds to select one of the unprocessed tiers in the list for processing at 310-2-7-4. If there are no more tiers to process in the Alternate site, then proceeding further makes no sense and the program ends as in Step 310-2-7-13.

At 310-2-7-5, a determination is made as to whether the selected tier is equivalent to the tier of the production volume. Depending on the response, the restore time is estimated. Next, the flow estimates the restore time for each of the tier in Alternate site and stores the result in Restore time info table 340. To do so, the read throughput of the tier is obtained from the Storage tier info table 330 as explained in Step 310-2-7-6 for tiers that are not equivalent as determined at 310-2-7-5. Since the minimum of read and write throughput limits the restore operation, the restore time is calculated according to the equation in Step 310-2-7-7.

Since there is no extra effort required if the Alternate volume is already stored in the original tier, a constant restore time is recorded. In this example, the time is set to 5 minutes as in Step 310-2-7-8, but can be changed to accommodate the desired implementation. This depends on how much of the failover task is automated and a different value is also possible. The restore time is then set in the Restore time info table 340 accordingly at 310-2-7-9, and the tier is marked as processed at 310-2-7-10.

At 310-2-7-11, a determination is made as to whether there are any more unprocessed tiers. If so (yes), then the flow proceeds to the next unprocessed tier at 310-2-7-4, otherwise (No), the flow ends. A record (a row) for the volume being currently processed (e.g., vol-order or vol-inventory) is created in the Restore time info table 340.

Figure 12:
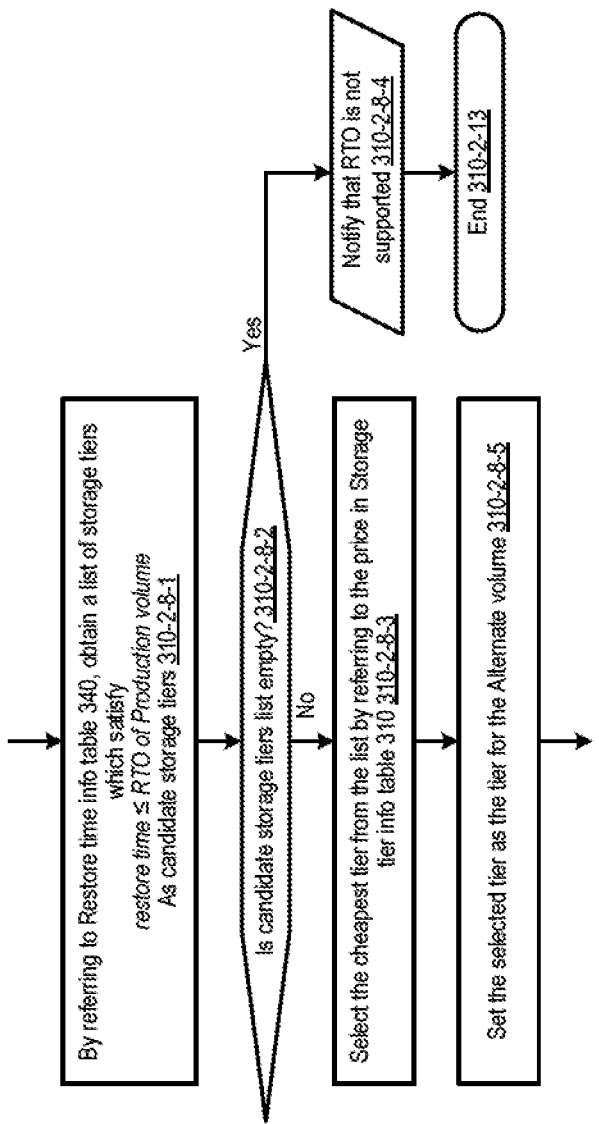
FIG. 12 illustrates an example flow of the Storage tier determination module which is a part of the Copy data's tier management program, in accordance with an example implementation.

FIG. 12 illustrates an example flow of the Storage tier determination module 310-2-8 which is a part of the Copy data's tier management program 310, in accordance with an example implementation. The flow determines a tier in the Alternate site for storing the Alternate volume of the Production volume which is being processed. The RTO is guaranteed if the Alternate volume is stored in this tier. Moreover, this tier is the cheapest possible tier which can satisfy the RTO.

As explained in Step 310-2-8-1, by comparing the RTO of the volume with restore time in Restore time info table 340, a list of candidate tiers is obtained. The Alternate volume can be stored in any of these tiers, and the RTO will be satisfied. An empty candidate list means that the RTO cannot be satisfied and hence the program ends by notifying about it to the Service consumer 500 at 310-2-8-4 and 310-2-8-5, as explained in Step 310-2-8-2.

Otherwise, the cheapest among the candidate tiers is determined to be the tier for the Alternate volume as explained in Step 310-2-8-3, and that tier is then set for the Alternate volume 310-2-8-5.

In another example implementation, the volumes can involve thin provisioned volumes whose size may increase in the future. The RTO violation will occur because the restore time will change. To cover this case, the Copy data's tier management program 310 can have a Re-tiering module. Its job is to continuously check the size of the Production volumes and re-tier if the size increased, the details of which are explained in the flowchart of FIG. 13A.

Figure 13A:
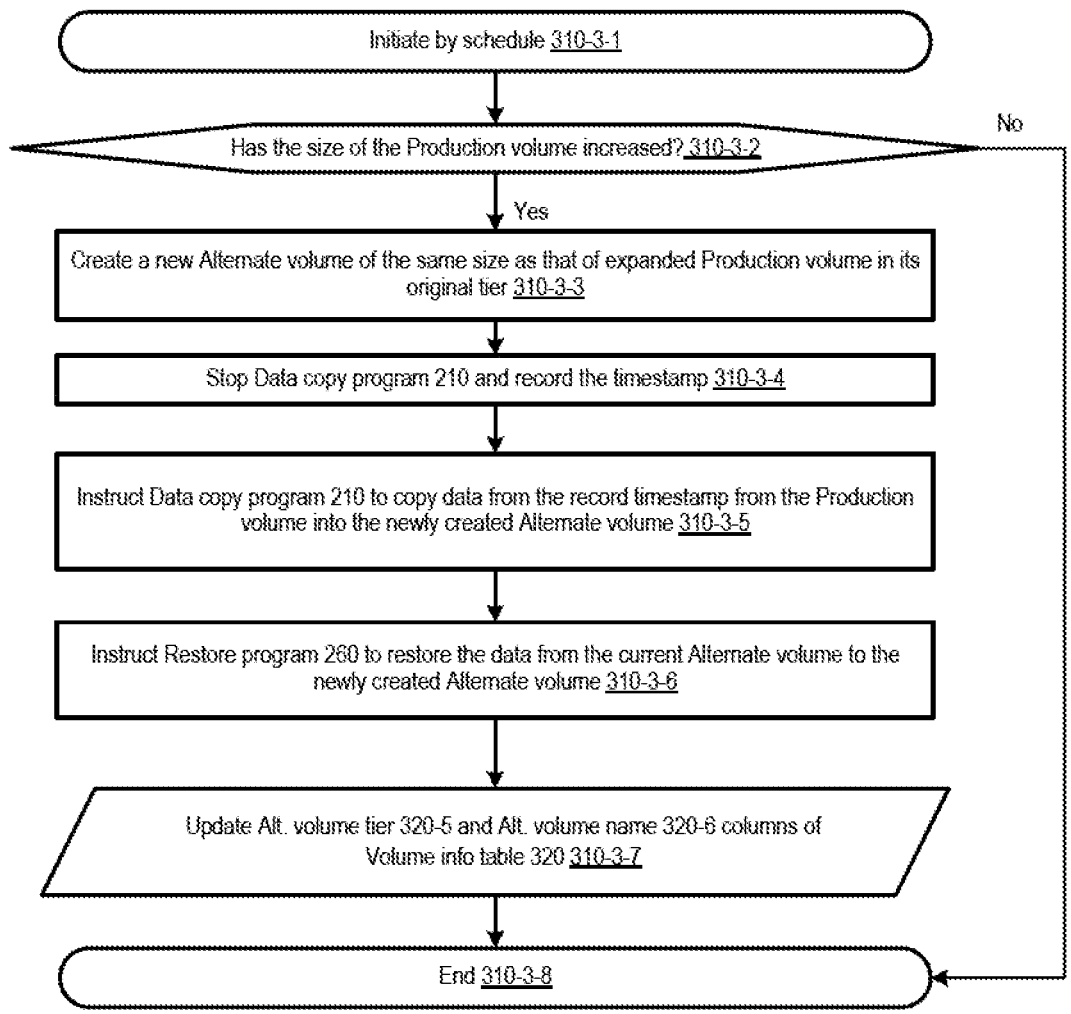
FIG. 13A illustrates an example flow of the re-tiering module, in accordance with an example implementation.

FIG. 13A illustrates an example flow of the re-tiering module, in accordance with an example implementation. This module is runs periodically and is triggered by a schedule as in Step 310-3-1 and is conducted by the copy data's tier management program 310. For example, it can be triggered every 5 minutes by a cron job. The flow checks if the Production volume, which are listed in Volume info table 320, has changed in its size as explained in Step 310-3-2. To do so, it can query the size of the Production volume from the management server in the Production site. If the size has changed (Yes), then re-tiering is initiated at 310-3-3, otherwise (No) the program ends at 310-3-8.

The re-tiering process can involve two phases.

The first phase is to stop copying data to the current Alternate volume (Step 310-3-4) and start copying data to a new Alternate volume 310-3-5. This new Alternate volume is created in the original tier (Step 310-3-3) so that failover is as fast as possible.

Figure 13B:
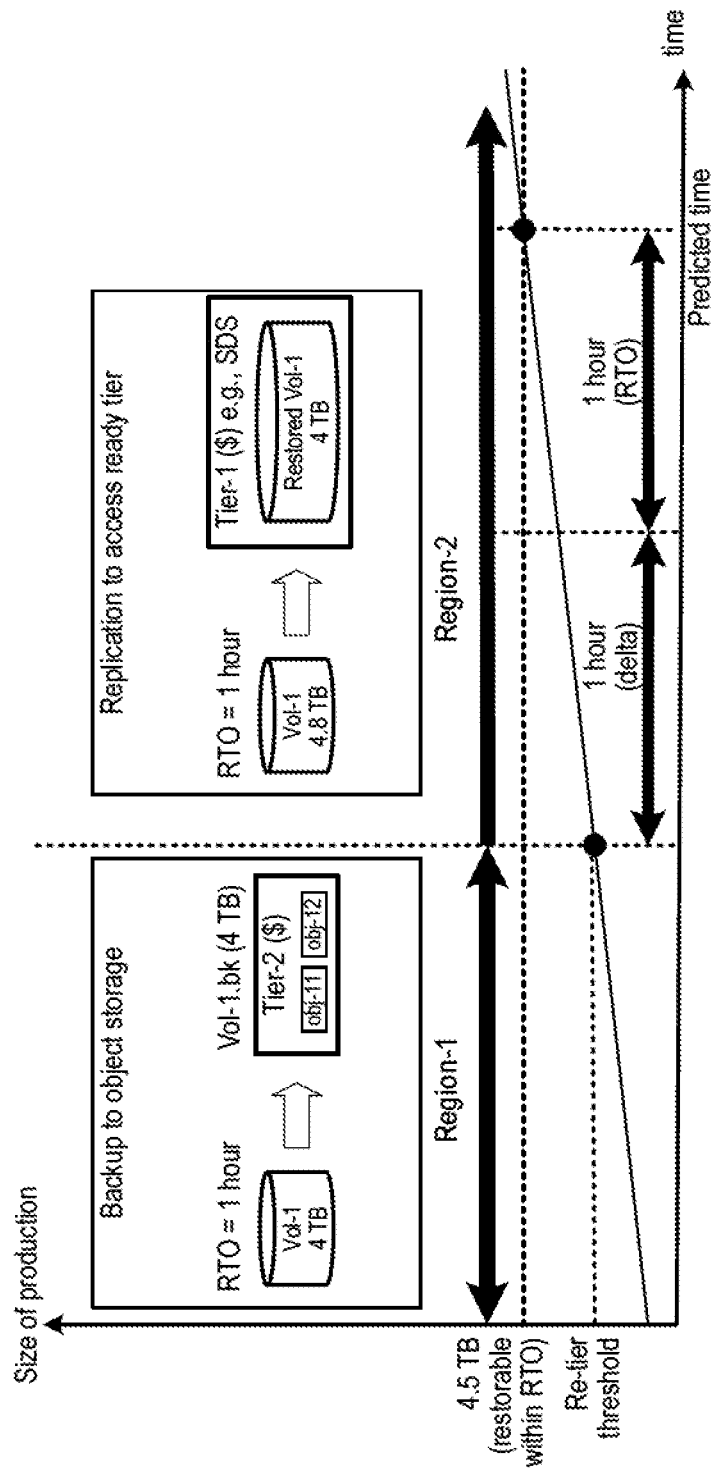
FIG. 13B illustrates an overview of replication to an access ready tier for when the volume increases in size, in accordance with an example implementation.

FIG. 13B illustrates an overview of replication to an access ready tier for when the volume increases in size, in accordance with an example implementation. Initially backup files are stored in a lower tier storage, such as the cheapest object storage. They are stored there until the size is increased beyond the re-tier threshold. Once the re-tier threshold is reached, the disaster recovery copy destination is changed to an access ready tier. Replication to access ready tier can be done using replication technologies such as known in the art in accordance with the desired implementation. As illustrated in FIG. 13B, the delta accounts for the time taken for initial copy of the data from production tier to the new tier.

The second phase is to copy data from the current Alternate volume to the newly created Alternate volume (Step 310-3-6). However, there is a special operation in this step. The Restore program must not overwrite any block in the newly created Alternate volume. This is because the blocks in the newly created Alternate volume has latest data than that of the current Alternate volume.

Figure 13C:
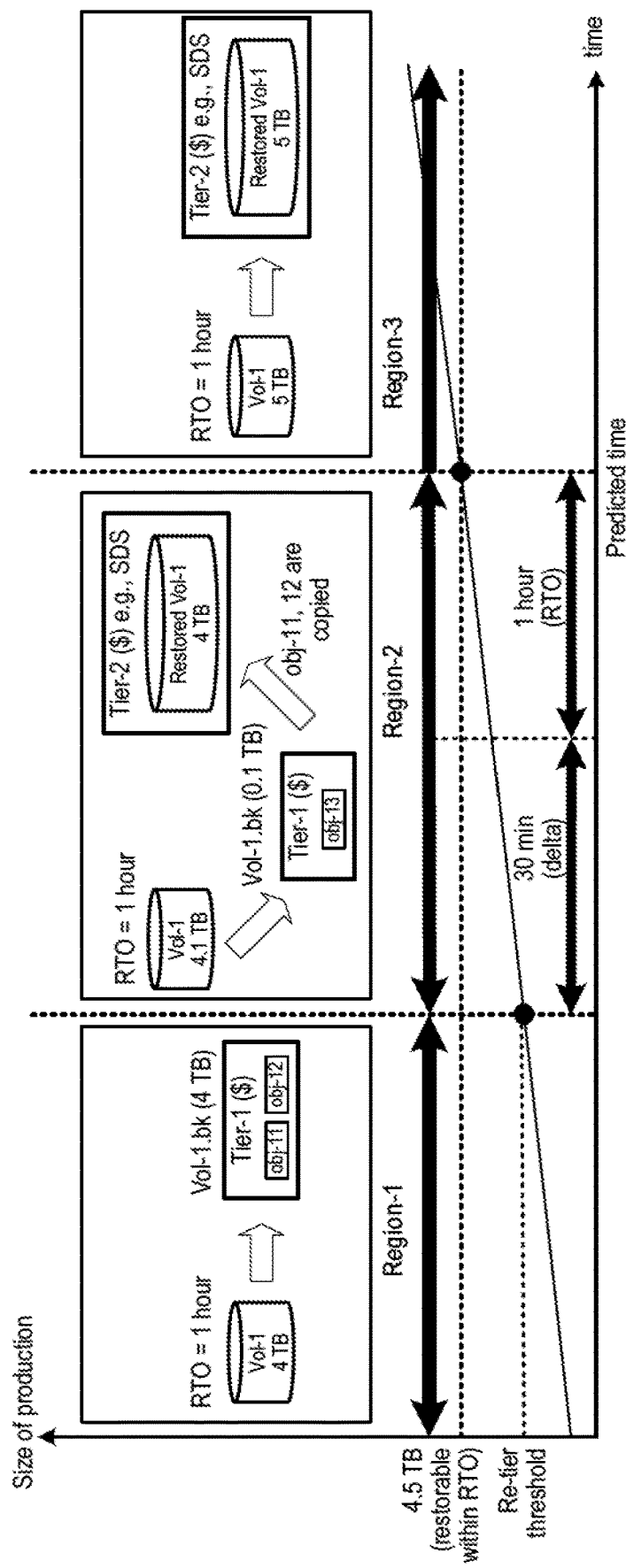
FIG. 13C illustrates an example of incremental backup in accordance with an example implementation.

FIG. 13C illustrates an example of incremental backup in accordance with an example implementation. Once the re-tier threshold is reached, restoration is initiated. Incremental backup is stored in object storage during this restoration. Once all objects are restored, the backup destination is changed to restored volume.

Finally, the tier name and volume name are updated in the Volume info table 320 at 310-3-7.

Through the example implementations described herein, the Service provider does not need to overprovision resources because the RTO is directly entered by the Service consumer. Thus, it is possible to estimate the resources necessary to satisfy the RTO reliably. Further, the Service consumer gets a reliable service at an economically competitive price and is encouraged to use it.

Figure 14:
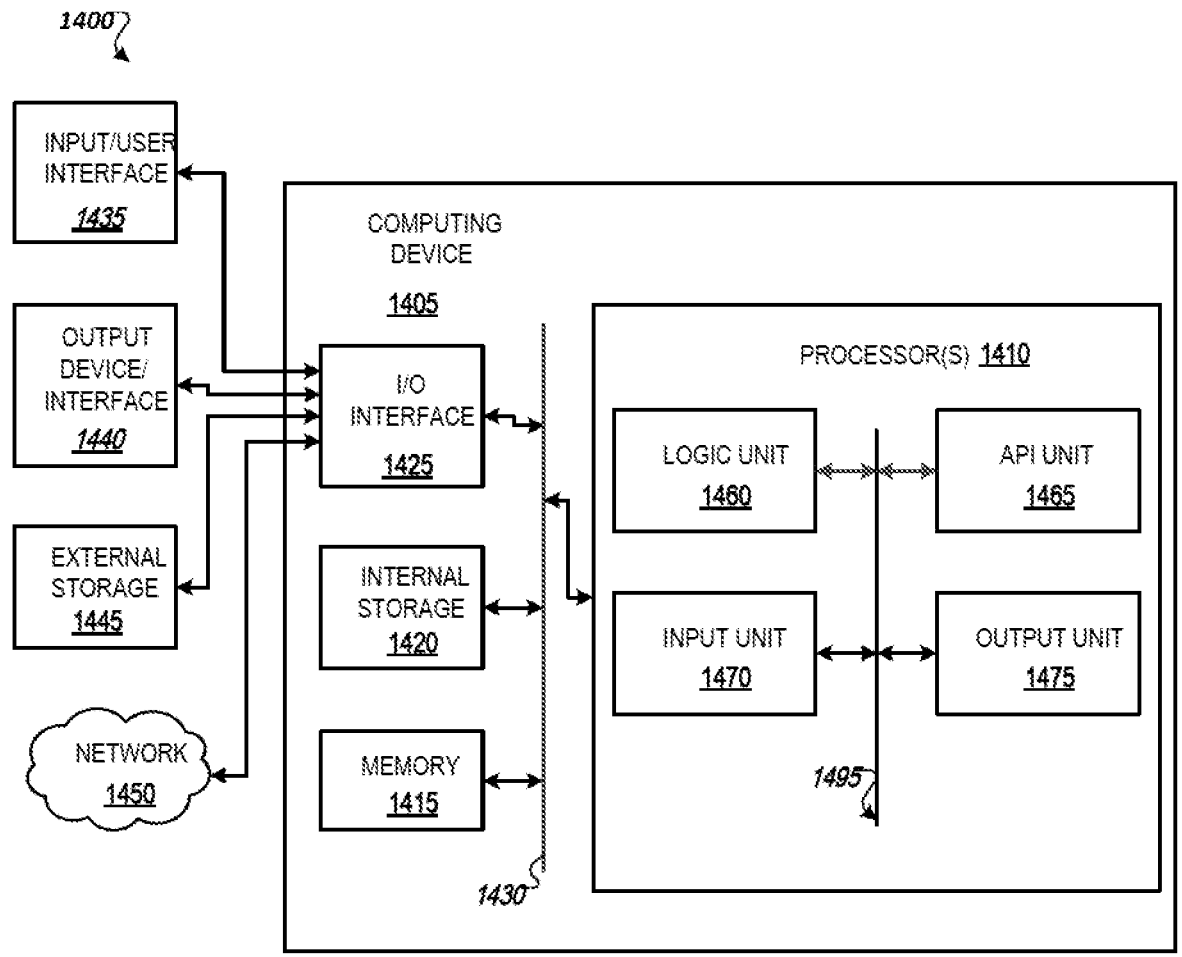
FIG. 14 illustrates an example computing environment with an example computer device suitable for use in some example implementations.

FIG. 14 illustrates an example computing environment with an example computer device suitable for use in some example implementations, such as the management server 300 as illustrated in FIG. 1 and configured to execute the flows as described herein. Computer device 1405 in computing environment 1400 can include one or more processing units, cores, or processors 1410, memory 1415 (e.g., RAM, ROM, and/or the like), internal storage 1420 (e.g., magnetic, optical, solid-state storage, and/or organic), and/or IO interface 1425, any of which can be coupled on a communication mechanism or bus 1430 for communicating information or embedded in the computer device 1405. IO interface 1425 is also configured to receive images from cameras or provide images to projectors or displays, depending on the desired implementation.

Computer device 1405 can be communicatively coupled to input/user interface 1435 and output device/interface 1440. Either one or both of the input/user interface 1435 and output device/interface 1440 can be a wired or wireless interface and can be detachable. Input/user interface 1435 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1440 may include a display, television, monitor, printer, speaker, braille, or the like. In some example implementations, input/user interface 1435 and output device/interface 1440 can be embedded with or physically coupled to the computer device 1405. In other example implementations, other computer devices may function as or provide the functions of input/user interface 1435 and output device/interface 1440 for a computer device 1405.

Examples of computer device 1405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1405 can be communicatively coupled (e.g., via IO interface 1425) to external storage 1445 and network 1450 for communicating with any number of networked components, devices, and systems, including one or more computer devices of the same or different configuration. Computer device 1405 or any connected computer device can be functioning as, providing services of, or referred to as a server, client, thin server, general machine, special-purpose machine, or another label.

IO interface 1425 can include but is not limited to, wired and/or wireless interfaces using any communication or IO protocols or standards (e.g., Ethernet, 802.11x, Universal System Bus, WiMAX, modem, a cellular network protocol, and the like) for communicating information to and/or from at least all the connected components, devices, and network in computing environment 1400. Network 1450 can be any network or combination of networks (e.g., the Internet, local area network, wide area network, a telephonic network, a cellular network, satellite network, and the like).

Computer device 1405 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1405 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1410 can execute under any operating system (OS) (not shown), in a native or virtual environment. One or more applications can be deployed that include logic unit 1460, application programming interface (API) unit 1465, input unit 1470, output unit 1475, and inter-unit communication mechanism 1495 for the different units to communicate with each other, with the OS, and with other applications (not shown). The described units and elements can be varied in design, function, configuration, or implementation and are not limited to the descriptions provided. Processor(s) 1410 can be in the form of hardware processors such as central processing units (CPUs) or in a combination of hardware and software units.

In some example implementations, when information or an execution instruction is received by API unit 1465, it may be communicated to one or more other units (e.g., logic unit 1460, input unit 1470, output unit 1475). In some instances, logic unit 1460 may be configured to control the information flow among the units and direct the services provided by API unit 1465, the input unit 1470, the output unit 1475, in some example implementations described above. For example, the flow of one or more processes or implementations may be controlled by logic unit 1460 alone or in conjunction with API unit 1465. The input unit 1470 may be configured to obtain input for the calculations described in the example implementations, and the output unit 1475 may be configured to provide an output based on the calculations described in example implementations.

Processor(s) 1410 can be configured to execute a method or instructions that can involve, for a request to create a recovery volume having a specified recovery time objective, identifying a tier from a storage system managing a plurality of tiers that has a restore time that satisfies the specified recovery time objective; and creating the recovery volume in the identified tier of the storage system in response to the request.

Processor(s) 1410 can be configured to execute the method or instructions as described above, wherein the identifying the tier from the storage system involves selecting a cheapest tier from the plurality of tiers having the restore time that satisfies the specified recovery time objective.

Processor(s) 1410 can be configured to execute the method or instructions as described above, wherein the request is received through a user interface configured to receive the specified recovery time objective as a value of time.

Depending on the desired implementation, the storage system can involve a software defined storage configured to provide an access ready storage tier as one of the plurality of tiers, and a cloud-based storage service configured to provide other ones of the plurality of tiers.

Processor(s) 1410 can be configured to execute the method or instructions as described above, and further involve, for a volume associated with the recovery volume having an increase in size, migrating the recovery volume to an alternate volume having an equivalent tier while maintaining a differential file between the volume and the recovery volume; and applying the differential file to the alternate volume after migration.

Processor(s) 1410 can be configured to execute the method or instructions above, wherein the equivalent tier is an access ready tier provided by software defined storage of the storage system.

Processor(s) 1410 can be configured to execute the method or instructions above, and further involve, for a volume associated with the recovery volume having an increase in size copying the recovery volume to an alternate volume having an equivalent tier; and associating the alternate volume as the recovery volume once the copying is complete.

Processor(s) 1410 can be configured to execute the method or instructions above, wherein the equivalent tier is an access ready tier provided by software defined storage of the storage system.

Processor(s) 1410 can be configured to execute the method or instructions above, wherein the restore time for each of the plurality of tiers is determined from ratio of a size of a volume associated with the request to a minimum throughput across all components in a restoration process of the each of the plurality of tiers.

Processor(s) 1410 can be configured to execute the method or instructions above, and further involve determining whether a re-tiering of the recovery volume is required based on changes to the volume against the specified recovery time objective, and migrating the recovery volume to another tier from the plurality of tiers for a determination that re-tiering is required.

Processor(s) 1410 can be configured to execute the method or instructions above, wherein the determining whether the re-tiering of the recovery volume is requires is conducted periodically.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
for a request to create a recovery volume having a specified recovery time objective, wherein the specified recovery time objective is time taken after failure of production data to being data online:
identifying a tier, from a storage system managing a plurality of tiers, that has a restore time that satisfies the specified recovery time objective; and
creating the recovery volume in the identified tier of the storage system in response to the request.

2. The method of claim 1, wherein the identifying the tier from the storage system comprises selecting a cheapest tier, from the plurality of tiers, having the restore time that satisfies the specified recovery time objective.

3. The method of claim 1, wherein the request is received through a user interface configured to receive the specified recovery time objective as a value of time.

4. The method of claim 1, wherein the storage system comprises a software defined storage configured to provide an access ready storage tier as one of the plurality of tiers, and a cloud-based storage service configured to provide other ones of the plurality of tiers.

5. The method of claim 1, further comprising, for a volume associated with the recovery volume having an increase in size:
migrating the recovery volume to an alternate volume in an original tier while maintaining a differential file between the volume and the recovery volume; and
applying the differential file to the alternate volume after migration.

6. The method of claim 5, wherein the original tier is an access ready tier provided by software defined storage of the storage system.

7. The method of claim 1, further comprising, for a volume associated with the recovery volume having an increase in size:
- copying the recovery volume to an alternate volume in an original tier; and
- associating the alternate volume as the recovery volume once the copying is complete.

8. The method of claim 7, wherein the original tier is an access ready tier provided by software defined storage of the storage system.

9. The method of claim 1, wherein the restore time for each of the plurality of tiers is determined from ratio of a size of a volume associated with the request to a minimum throughput across all components in a restoration process of the each of the plurality of tiers.

10. The method of claim 1, further comprising determining whether a re-tiering of the recovery volume is required based on changes to a production volume against the specified recovery time objective, wherein the recovery volume is of the production volume and
- migrating the recovery volume to another tier from the plurality of tiers for a determination that re-tiering is required.

11. The method of claim 10, wherein the determining whether the re-tiering of the recovery volume is required is conducted periodically.

12. A non-transitory computer readable medium, storing instructions for executing a process, the instructions comprising:
- for a request to create a recovery volume having a specified recovery time objective, wherein the specified recovery time objective is time taken after failure of production data to bring data online:
- identifying a tier, from a storage system managing a plurality of tiers, that has a restore time that satisfies the specified recovery time objective; and
- creating the recovery volume in the identified tier of the storage system in response to the request.

13. An apparatus comprising:
a processor, configured to:
- for a request to create a recovery volume having a specified recovery time objective, wherein the specified recovery time objection is time taken after failure of production data to bring data online:
- identify a tier, from a storage system managing a plurality of tiers, that has a restore time that satisfies the specified recovery time objective; and
- create the recovery volume in the identified tier of the storage system in response to the request.

* * * * *